United States Patent
Yokota et al.

(10) Patent No.: US 9,120,293 B2
(45) Date of Patent: Sep. 1, 2015

(54) PRELIMINARY-CURED MATERIAL, ROUGHENED PRELIMINARY-CURED MATERIAL, AND LAMINATED BODY

(75) Inventors: Reona Yokota, Tsukuba (JP); Koichi Shibayama, Tsukuba (JP); Akihiro Uenishi, Tsukuba (JP); Hidenobu Deguchi, Tsukuba (JP); Tomoki Kunikawa, Tsukuba (JP); Tatsushi Hayashi, Tsukuba (JP)

(73) Assignee: SEIKU CHEMICAL CO., LTD., Osaka (JP)

( * ) Notice: Subject to any disclaimer, the term of this patent is extended or adjusted under 35 U.S.C. 154(b) by 213 days.

(21) Appl. No.: 13/582,214

(22) PCT Filed: Mar. 31, 2011

(86) PCT No.: PCT/JP2011/058198
§ 371 (c)(1), (2), (4) Date: Sep. 19, 2012

(87) PCT Pub. No.: WO2012/131971
PCT Pub. Date: Oct. 4, 2012

(65) Prior Publication Data
US 2013/0108861 A1  May 2, 2013

(51) Int. Cl.
*B32B 5/16* (2006.01)
*B32B 27/20* (2006.01)
(Continued)

(52) U.S. Cl.
CPC ............ *B32B 15/092* (2013.01); *B32B 27/20* (2013.01); *B32B 27/38* (2013.01); *C08G 59/4014* (2013.01); *C08G 59/42* (2013.01); *C08G 59/621* (2013.01); *C08G 59/686* (2013.01);
(Continued)

(58) Field of Classification Search
None
See application file for complete search history.

(56) References Cited

U.S. PATENT DOCUMENTS 5,976,699 A * 11/1999 Hosomi et al. ............... 428/418
2009/0015926 A1 * 1/2009 Iwata et al. .................... 359/601
(Continued)

FOREIGN PATENT DOCUMENTS

JP  2004-277728  10/2004
JP  2005-285540  10/2005
(Continued)

OTHER PUBLICATIONS

Taiwanese Office Action issued with respect to counterpart Taiwanese Application No. 100111671, dated Nov. 23, 2012.
Search report from International Application No. PCT/JP2011/058198, mail date is Jul. 5, 2011.

*Primary Examiner* — Coris Fung
(74) *Attorney, Agent, or Firm* — Greenblum & Bernstein, P.L.C.

(57) ABSTRACT

A preliminary-cured material permits reduced surface roughness of a roughening-treated surface, and increase of an adhesive strength between a cured object and a metal layer. The preliminary-cured material is obtained by advancing curing of an epoxy resin material that contains an epoxy resin, a curing agent, and a silica. The preliminary-cured material includes a first principal surface to be roughening-treated, and a second principal surface. The silica includes a first small particle-diameter silica whose particle diameter is not smaller than 0.01 μm but smaller than 0.5 μm, and a second large particle-diameter silica whose particle diameter is not smaller than 0.5 μm but not larger than 20 μm. The first small particle-diameter silica is localized to exist in large quantity on a side of the first principal surface, and the second large particle-diameter silica is localized to exist in large quantity on a side of the second principal surface.

6 Claims, 1 Drawing Sheet (51) Int. Cl.
  *B32B 27/38* (2006.01)
  *C08J 7/00* (2006.01)
  *G11B 5/64* (2006.01)
  *B32B 15/092* (2006.01)
  *C08G 59/40* (2006.01)
  *C08G 59/42* (2006.01)
  *C08G 59/62* (2006.01)
  *C08G 59/68* (2006.01)
  *C08L 63/00* (2006.01)
  *C08K 3/36* (2006.01)

(52) U.S. Cl.
  CPC . *C08J 7/00* (2013.01); *C08L 63/00* (2013.01); *C08K 3/36* (2013.01); *Y10T 428/259* (2015.01); *Y10T 428/268* (2015.01)

(56) References Cited

U.S. PATENT DOCUMENTS

| | | |
|---|---|---|
| 2009/0104429 A1 | 4/2009 | Goto et al. |
| 2009/0230568 A1* | 9/2009 | Yasuda et al. ............... 257/787 |
| 2010/0065314 A1* | 3/2010 | Lin et al. .................... 174/258 |
| 2011/0217512 A1 | 9/2011 | Heishi et al. |

FOREIGN PATENT DOCUMENTS

| | | |
|---|---|---|
| JP | 2008-302677 | 12/2008 |
| TW | 201012652 | 4/2010 |
| TW | 201022319 | 6/2010 |
| WO | 2007/032424 | 3/2007 |
| WO | 2009/038166 | 3/2009 |
| WO | 2010/035452 | 4/2010 |

\* cited by examiner

PRELIMINARY-CURED MATERIAL, ROUGHENED PRELIMINARY-CURED MATERIAL, AND LAMINATED BODY

TECHNICAL FIELD

The present invention relates to: a preliminary-cured material obtained by using an epoxy resin material containing an epoxy resin, a curing agent, and a silica, and advancing curing of the epoxy resin material; and a roughened preliminary-cured material and a laminated body using the preliminary-cured material.

BACKGROUND ART

Hitherto, various resin compositions are used in order to obtain electronic components such as laminated plates and printed wiring boards. For example, in multilayer printed wiring boards, resin compositions are used for forming insulation layers to insulate interlayers located internally, and for forming insulation layers located on surface layer portions.

As one example of such resin compositions, Patent Literature 1 described below discloses a resin composition containing an epoxy resin, a curing agent, a phenoxy resin, and an inorganic filler having a mean particle diameter of 0.01 to 2 μm. Furthermore, Patent Literature 1 also discloses a resin composition containing an epoxy resin, a curing agent, and an inorganic filler having a mean particle diameter of 0.1 to 10 μm.

In Patent Literature 1, each layer in a multilayer film having a two-layer laminated structure is formed using the above described different two types of resin compositions. It is disclosed that the multilayer film is finely embedded in gaps disposed on a substrate.

Patent Literature 2 described below discloses a resin composition containing an epoxy resin, a curing agent, at least one among a phenoxy resin and a polyvinyl acetal resin, and a phosphorus containing benzoxazine compound. Patent Literature 2 discloses that, when a roughening treatment is performed on a cured object obtained by curing the resin composition, even though roughness of a roughened surface is relatively small, the roughened surface shows high adhesion force with respect to a plated conductor, and an insulation layer having excellent fire-resistance can be obtained.

CITATION LIST

Patent Literature

[PTL 1] Japanese Laid-Open Patent Publication No. 2008-302677
[PTL 2] WO2009/038166A1

SUMMARY OF THE INVENTION

Problems to be Solved by the Invention

In Patent Literature 1, since two types of resin compositions are prepared to produce the multilayer film, time and effort are needed for producing the multilayer film and thereby there is a problem of high cost.

Although Patent Literature 2 discloses that the roughness is small when the resin composition has the above described composition, there are cases where the roughness of the roughened surface is not sufficiently small.

In addition, with the multilayer film disclosed in Patent Literature 1 and the resin composition disclosed in Patent Literature 2, when metal layers are formed on surfaces of cured objects obtained by curing those using a plating process, there are cases where it is difficult to sufficiently increase adhesive strength between the cured objects and the metal layers.

An objective of the present invention is to provide: a preliminary-cured material that allows reduction of surface roughness of a surface of a roughened preliminary-cured material on which a roughening treatment has been performed, and increase in adhesive strength between a metal layer and a cured object obtained by curing the roughened preliminary-cured material; and the roughened preliminary-cured material and a laminated body using the preliminary-cured material.

Solution to the Problems

With a broad aspect of the present invention, provided is a preliminary-cured material obtained by advancing curing of an epoxy resin material, wherein: the preliminary-cured material includes a first principal surface and a second principal surface, and the first principal surface is a surface on which a roughening treatment is to be conducted; the epoxy resin material contains an epoxy resin, a curing agent, and a silica; the silica includes a first small particle-diameter silica whose particle diameter is not smaller than 0.01 μm but smaller than 0.5 μm, and a second large particle-diameter silica whose particle diameter is not smaller than 0.5 μm but not larger than 20 μm; and in the preliminary-cured material, the first small particle-diameter silica is localized so as to exist in large quantity on a side of the first principal surface which is the surface on which the roughening treatment is to be conducted, and the second large particle-diameter silica is localized so as to exist in large quantity on a side of the second principal surface.

In a specific aspect of the preliminary-cured material according to the present invention, with respect to 100 volume % of all silica included in a first region that is a 0.3 μm-thick surface portion on the first principal surface side which is the surface on which the roughening treatment is to be conducted, a contained amount of the second large particle-diameter silica in the first region is not more than 5 volume %.

In another specific aspect of the preliminary-cured material according to the present invention, a minimum melt viscosity of the epoxy resin material in a temperature range of 60 to 120° C. before preliminary-curing is not lower than 50 Pa·s but not higher than 150 Pa·s.

In another specific aspect of the preliminary-cured material according to the present invention, the epoxy resin material further contains a phenoxy resin.

A roughened preliminary-cured material according to the present invention is a roughened preliminary-cured material obtained by conducting a roughening treatment on the first principal surface of the preliminary-cured material formed in accordance with the present invention.

In a specific aspect of the roughened preliminary-cured material according to the present invention, a swelling treatment is conducted on the preliminary-cured material before the roughening treatment.

A laminated body according to the present invention includes: a cured object resulting from curing of a roughened preliminary-cured material obtained by conducting a roughening treatment on the first principal surface of the preliminary-cured material formed in accordance with the present invention; and a metal layer formed on the surface of the cured object, on which the roughening treatment has been conducted. An adhesive strength between the cured object and the metal layer is preferably not less than 0.39 N/mm.

Advantageous Effects of the Invention

The preliminary-cured material according to the present invention is a preliminary-cured material obtained by advancing curing of an epoxy resin material containing an epoxy resin, a curing agent, and a silica. The silica includes a first small particle-diameter silica whose particle diameter is not smaller than 0.01 μm but smaller than 0.5 μm, and a second large particle-diameter silica whose particle diameter is not smaller than 0.5 μm but not larger than 20 μm. In the preliminary-cured material, the first small particle-diameter silica is localized so as to exist in large quantity on a side the first principal surface which is the surface on which the roughening treatment is to be conducted, and the second large particle-diameter silica is localized so as to exist in large quantity on a side of the second principal surface. Therefore, when roughening treatment is conducted on the first principal surface of the preliminary-cured material, surface roughness of the roughening-treated surface of the roughened preliminary-cured material can be reduced. In addition, when a metal layer is formed on a surface of the cured object resulting from curing the roughened preliminary-cured material, the adhesive strength between the cured object and the metal layer can be increased.

DESCRIPTION OF EMBODIMENTS

In the following, specific embodiments and examples of the present invention will be described with reference to the drawings to explain the present invention.

Figure 1:
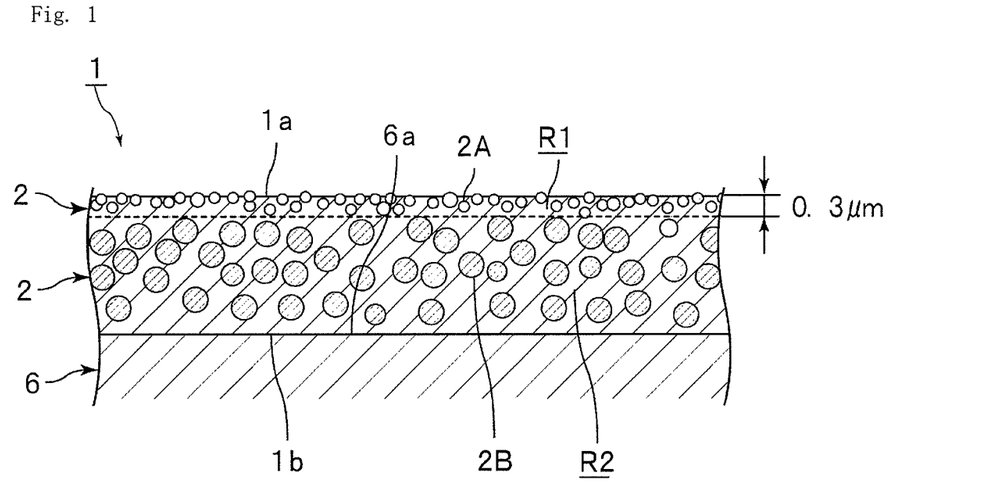
FIG. 1 is a partially-cut front sectional view that schematically shows a preliminary-cured material according to one embodiment of the present invention.

A preliminary-cured material according to the present invention is a preliminary-cured material obtained by advancing curing of an epoxy resin material. FIG. 1 is a front sectional view that schematically shows the preliminary-cured material according to one embodiment of the present invention.

A preliminary-cured material 1 shown in FIG. 1 is laminated on an upper surface 6a of a lamination target member 6. The preliminary-cured material 1 includes a first principal surface 1a and a second principal surface 1b. The first principal surface 1a is a surface that is to be roughening-treated. The second principal surface 1b is in contact with the upper surface 6a of the lamination target member 6. The epoxy resin material for obtaining the preliminary-cured material 1 contains an epoxy resin, a curing agent, and a silica 2.

The silica 2 includes a first small particle-diameter silica 2A whose particle diameter is not smaller than 0.01 μm but smaller than 0.5 μm, and a second large particle-diameter silica 2B whose particle diameter is not smaller than 0.5 μm but not larger than 20 μm.

In the preliminary-cured material 1, the first small particle-diameter silica 2A is localized so as to exist in large quantity on a side of the first principal surface 1a which is the surface that is to be roughening-treated. In the preliminary-cured material 1, the second large particle-diameter silica 2B is localized so as to exist in large quantity on a side of the second principal surface 1b.

By having the first small particle-diameter silica 2A and the second large particle-diameter silica 2B localized in the preliminary-cured material 1 in the above described manner, when the first principal surface 1a is roughening-treated, minute pores are formed on the first principal surface 1a due to elimination of the first small particle-diameter silica 2A. As a result, surface roughness of the roughening-treated surface can be reduced. In addition, when a metal layer is formed on the surface of a cured object resulting from curing the roughened preliminary-cured material obtained by the roughening treatment, the adhesive strength between the cured object and the metal layer can be increased. Furthermore, by having the first small particle-diameter silica 2A and the second large particle-diameter silica 2B localized in the above described manner, strength of the preliminary-cured material 1 and the roughened preliminary-cured material obtained by conducting a roughening treatment on the first principal surface 1a of the preliminary-cured material 1 can be further increased. In particular, using the second large particle-diameter silica 2B results in reduced interface between the silica and the resin, improvement in embedding processability due to lowering of melt viscosity, and improvement in electrical insulation properties, water absorptivity, and chemical resistance of the preliminary-cured material 1, the roughened preliminary-cured material, and the cured object.

From a standpoint of further reducing the surface roughness of the roughening-treated surface of the roughened preliminary-cured material and further increasing the adhesive strength between the cured object and the metal layer, and from a standpoint of further increasing the strength of the preliminary-cured material and the roughened preliminary-cured material; with respect to 100 volume % of all silica included in a first region R1 (region above a dashed line in FIG. 1) that is a 0.3 μm-thick surface portion on the first principal surface 1a side which is the surface that is to be roughening-treated, a contained amount of the second large particle-diameter silica in the first region R1 is preferably not more than 5 volume %, more preferably not more than 4 volume %, further preferably not more than 3 volume %, and particularly preferably 0 volume %. The first region R1 may not contain the second large particle-diameter silica at all.

From a standpoint of further reducing the surface roughness of the roughening-treated surface of the roughened preliminary-cured material and further increasing the adhesive strength between the cured object and the metal layer; with respect to 100 volume % of all silica included in a second region R2 (region below the dashed line in FIG. 1) on the second principal surface 1b side connected to the first region R1, a contained amount of the second large particle-diameter silica 2B in the second region R2 is preferably not less than 95 volume % but equal to or less than 100 volume %, and more preferably not less than 96 volume %, and further preferably not less than 97 volume %.

It should be noted that the second region R2 is connected to the first region R1. The first region R1 and the second region R2 are in contact with each other. The second region R2 is the rest of the region excluding the first region R1.

A minimum melt viscosity of the epoxy resin material in a temperature range of 60 to 120° C. before preliminary-curing is preferably not higher than 300 Pa·s. The melt viscosity is preferably not lower than 10 Pa·s, more preferably not lower than 50M Pa·s, and further preferably higher than 50M Pa·s, and more preferably not higher than 150M Pa·s, further preferably not higher than 120 Pa·s, and particularly preferably not higher than 100 Pa·s. When the melt viscosity of the epoxy resin material is not lower than the above described lower limit but not higher than the above described upper limit, the surface roughness of the roughening-treated surface of the roughened preliminary-cured material is further reduced and the adhesive strength between the cured object and the metal layer is further increased.

The above described "melt viscosity" is a value measured using a rheometer with a condition of heating the epoxy resin material from 50° C. to 150° C. prior to the preliminary-curing. Examples of the rheometer include "AR-2000" manufactured by TA Instruments Inc., etc.

It should be noted that the first small particle-diameter silica 2A and the second large particle-diameter silica 2B may not be localized in the manner described above by simply using the first small particle-diameter silica 2A and the second large particle-diameter silica 2B together. Specific methods for localizing the first small particle-diameter silica 2A and the second large particle-diameter silica 2B in the preliminary-cured body 1 as described above include: a method of localizing a resin on the surface with temperature and pressure used at the time of lamination; a method of localizing a resin on the surface at the time of pressing for flattening; a method of localizing a resin at the time of curing, and the like. In order to localize the first small particle-diameter silica 2A and the second large particle-diameter silica 2B in the preliminary-cured body 1 as described above, softening points or melting points of both the epoxy resin and the curing agent are preferably adjusted close to a lamination temperature, and the lamination process and a flattening process are preferably conducted in separate steps.

In the following, details of each component contained in the epoxy resin material will be described.

(Epoxy Resin Material)

[Epoxy Resin]

There is no particular limitation in the epoxy resin contained in the epoxy resin material. As the epoxy resin, a hitherto known epoxy resin can be used. The epoxy resin is an organic compound including at least one epoxy group. With regard to the epoxy resin, a single type may be used by itself, or a combination of two or more types may be used.

Examples of the epoxy resin include bisphenol A type epoxy resins, bisphenol F type epoxy resins, bisphenol S type epoxy resins, phenol novolac type epoxy resins, biphenyl novolac type epoxy resins, biphenol type epoxy resins, naphthalene type epoxy resins, fluorene type epoxy resins, phenol aralkyl type epoxy resins, naphthol aralkyl type epoxy resins, dicyclopentadiene novolac type epoxy resins, anthracene type epoxy resins, epoxy resins having an adamantane backbone, epoxy resins having a tricyclodecane backbone, epoxy resins having a triazine nucleus as a backbone, and the like.

From a standpoint of further reducing the surface roughness of the roughening-treated surface of the roughened preliminary-cured material and further increasing the adhesive strength between the cured object and the metal layer, the epoxy resin is preferably a biphenyl novolac type epoxy resin or a dicyclopentadiene type epoxy resin.

The epoxy resin is preferably an epoxy resin that is bifunctional or has a higher functionality, and more preferably is a polyfunctional epoxy resin. Examples of the polyfunctional epoxy resin include trifunctional alicyclic epoxy monomers ("Epolead GT301" manufactured by Union Carbide Corp.), trivalent epoxy resins having a triazine nucleus as a backbone ("DENACOL EX-301" manufactured by Nagase ChemteX Corp., and "TEPIC-S" manufactured by Nissan Chemical Industries, Ltd.), and as polyfunctional epoxy resins, biphenyl novolac type epoxy resins ("NC3000H" manufactured by Nippon Kayaku Co., Ltd.), dicyclopentadiene novolac type epoxy resins ("HP-7200" manufactured by DIC Corp.), bisphenol A novolac type epoxy resins ("157-S70" Mitsubishi Chemical Corp.), etc.

The melting point or softening point of the epoxy resin is preferably equal to or higher than 50° C. and more preferably equal to or higher than 65° C.; and preferably equal to or lower than 90° C. and more preferably equal to or lower than 85° C. By having the melting point or softening point of the epoxy resin not lower than the above described lower limit but not higher than the above described upper limit, the first small particle-diameter silica and the second large particle-diameter silica will exist in the above described preferable localization state within the preliminary-cured material obtained by preliminary-curing the epoxy resin material on the lamination target member. As a result, when roughening treatment is conducted on the surface of the preliminary-cured material, the surface roughness of the roughening-treated surface of the roughened preliminary-cured material is further reduced. In addition, when the melting point or softening point of the epoxy resin is not lower than the above described lower limit but not higher than the above described upper limit, the adhesive strength between the metal layer and the cured object resulting from curing the roughened preliminary-cured material is also increased.

From a standpoint of further reducing the surface roughness of the roughening-treated surface of the roughened preliminary-cured material and further increasing the adhesive strength between the cured object and the metal layer: an epoxy equivalent of the epoxy resin is preferably equal to or higher than 90, and more preferably equal to or higher than 100; and preferably equal to or lower than 1000 and more preferably equal to or lower than 800.

A weight average molecular weight of the epoxy resin is preferably equal to or less than 5000. In such a case, the contained amount of silica in the epoxy resin material can be increased. Furthermore, even when the contained amount of silica is large, a resin composition which is an epoxy resin material having high fluidity can be obtained. On the other hand, when the epoxy resin having a weight average molecular weight equal to or less than 5000 and a phenoxy resin are used in combination, decrease of the melt viscosity of a B stage film which is an epoxy resin material can be suppressed. Therefore, when the B stage film is laminated on a substrate, an excellent localization state of the silica can be obtained.

[Curing Agent]

There is no particular limitation in the curing agent contained in the epoxy resin material. As the curing agent, a hitherto known curing agent can be used. With regard to the curing agent, a single type may be used by itself, or a combination of two or more types may be used.

Examples of the curing agent include cyanate ester resins (cyanate ester curing agents), phenolic compounds (phenol curing agent), amine compounds (amine curing agents), thiol compounds (thiol curing agents), imidazole compounds, phosphine compounds, acid anhydrides, active ester compounds, and dicyandiamide, etc. Among those, from a standpoint of obtaining a cured object that has a further small dimensional change derived by heat, the curing agent is preferably a cyanate ester resin or a phenolic compound. As the curing agent, a cyanate ester resin is preferable, and a phenolic compound is also preferable. The curing agent preferably has a functional group capable of reacting with an epoxy group in the epoxy resin.

From a standpoint of further reducing the surface roughness of the roughening-treated surface of the roughened preliminary-cured material and further increasing the adhesive strength between the cured object and the metal layer; the curing agent is preferably a cyanate ester resin, a phenolic compound, or an active ester compound. Furthermore, from a standpoint of providing excellent insulation reliability by the curing agent, the curing agent is preferably a cyanate ester resin.

By using the above described cyanate resin, it is possible to obtain excellent handleability for a B stage film having a large contained amount of silica, and further raise a glass transition temperature of the cured object. There is no particular limitation in the cyanate ester resin. As the cyanate ester resin, a hitherto known cyanate ester resin can be used. With regard to the cyanate ester resin, a single type may be used by itself, or a combination of two or more types may be used.

Examples of the cyanate ester resin include novolac type cyanate resins and bisphenol type cyanate resins, etc. Examples of the bisphenol type cyanate resins include bisphenol A type cyanate resins, bisphenol F type cyanate resins, and tetramethyl bisphenol F type cyanate resins, etc.

Examples of commercially available products of the cyanate ester resin include phenol novolac type cyanate resins ("PT-30" and "PT-60" manufactured by Lonza Japan Ltd.), prepolymers obtained by modifying bisphenol A dicyanate to have a triazine structure so as to be a trimer ("BA230," "BA200," and "BA3000" manufactured by Lonza Japan Ltd.), etc.

By using the above described phenolic compound, the adhesive strength between the cured object and the metal layer can be further increased. In addition, when the phenolic compound is used, for example, by conducting a blacking process or a Cz process on a surface of copper disposed on the surface of the cured object, adhesivity between the cured object and copper can be further enhanced.

There is no particular limitation in the phenolic compound. As the phenolic compound, a hitherto known phenolic compound can be used. With regard to the phenolic compound, a single type may be used by itself, or a combination of two or more types may be used.

Examples of the phenolic compound include novolac type phenols, biphenol type phenols, naphthalene type phenols, dicyclopentadiene type phenols, and aralkyl type phenols, etc.

Examples of commercially available products of the phenolic compound include novolac type phenols ("TD-2091" manufactured by DIC Corp.), biphenyl novolac type phenols ("MEH-7851" manufactured by Meiwa Plastic Industries, Ltd.), and aralkyl type phenolic compounds ("MEH-7800" manufactured by Meiwa Plastic Industries, Ltd), etc.

From a standpoint of further reducing the surface roughness of the roughening-treated surface of the roughened preliminary-cured material and further increasing the adhesive strength between the cured object and the metal layer; the phenolic compound is preferably a biphenyl novolac type phenol or an aralkyl type phenolic compound.

There is no particular limitation in the above described active ester compound. Examples of commercially available products of the above described active ester compound include "EXB-9460S-65T" manufactured by DIC Corp., etc.

From a standpoint of further reducing the surface roughness of the roughening-treated surface of the roughened preliminary-cured material, further increasing the adhesive strength between the cured object and the metal layer, and providing excellent insulation reliability by the curing agent; an equivalent of the curing agent is equal to or lower than 250. The equivalent of the curing agent represents, for example, a cyanate ester group equivalent when the curing agent is a cyanate ester resin, represents a phenolic hydroxyl group equivalent when the curing agent is a phenolic compound, and represents an active ester group equivalent when the curing agent is an active ester compound.

By together using a curing agent having a weight average molecular weight equal to or lower than 1000, and a phenoxy resin; decrease in the melt viscosity of a B stage film which is an epoxy resin material can be suppressed. Therefore, when the B stage film is laminated on a substrate, an excellent localization state of the silica can be obtained.

In 100 weight % of total solid content excluding the silica contained in the epoxy resin material (hereinafter, sometimes represented as total solid content B), the contained amount of the total of the epoxy resin and the curing agent is preferably equal to or more than 75 weight %, and more preferably equal to or more than 80 weight %; and equal to or less than 100 weight %, preferably equal to or less than 99 weight %, and more preferably equal to or less than 97 weight %.

When the contained amount of the total of the epoxy resin and the curing agent is not less than the above described lower limit but not more than the above described upper limit; it becomes possible to obtain a further excellent cured object, obtain an excellent existing status of the silica due to an ability of adjusting the melt viscosity, and prevent the B stage film from becoming wet and spreading into unintended regions during the curing process. In addition, dimensional changes of the cured object due to heat can be further suppressed. Furthermore, when the contained amount of the total of the epoxy resin and the curing agent is less than the lower limit, it becomes difficult to embed the resin composition or the B stage film in holes or concavities/convexities on a circuit board, and the localization state of the silica tends to deteriorate. In addition, when the contained amount of the total of the epoxy resin and the curing agent is more than the upper limit, the melt viscosity becomes too low, and the B stage film tends to easily become wet and spread into unintended regions during the curing process. "Total solid content B" refers to a total of the epoxy resin, the curing agent, and other solid contents that are blended if necessary. The silica is not included in the total solid content B. "Solid content" refers to nonvolatile components, and components that do not become volatilized at the time of molding or heating.

There is no particular limitation in the blend ratio of the epoxy resin and the curing agent. The blend ratio of the epoxy resin and the curing agent can be determined as appropriate in accordance with the type of the epoxy resin and the curing agent.

[Filler]

The epoxy resin material contains the silica.

A mean particle diameter of all silica contained in the epoxy resin material is preferably not smaller than 0.1 µm, and preferably not larger than 0.8 µm.

As the mean particle diameter of the silica, a value of median diameter (d50) representing 50% is used. The mean particle diameter can be measured using a particle-size-distribution measuring device that employs a laser diffraction dispersion method.

The silica contained in the epoxy resin material includes the first small particle-diameter silica whose particle diameter is not smaller than 0.01 µm but smaller than 0.5 µm, and the second large particle-diameter silica whose particle diameter is not smaller than 0.5 µm but not larger than 20 µm. Among all the silica contained in the epoxy resin material, the first small particle-diameter silica is silica whose particle diameter is not smaller than 0.01 µm but smaller than 0.5 µm. Among all the silica contained in the epoxy resin material, the second large particle-diameter silica is silica whose particle diameter is not smaller than 0.5 µm but not larger than 20 µm.

It should be noted that, the particle diameters of the first small particle-diameter silica and the second large particle-diameter silica refer to the diameter when the silica are truly spherical, and refer to a maximum diameter when they are not truly spherical.

By combining the specific first small particle-diameter silica having a relatively small particle diameter and the specific second large particle-diameter silica having a relatively large particle diameter, and using them together with the epoxy resin and the curing agent; silica will exist excellently in the preliminary-cured material resulting from preliminary-curing the epoxy resin material but before conducting a roughening treatment thereon. As a result, when the roughening treatment is conducted on the surface of the preliminary-cured material, the surface roughness of the roughening-treated surface of the roughened preliminary-cured material can be reduced, and the adhesive strength between the metal layer and the cured object resulting from curing the roughened preliminary-cured material can be increased.

The silica is preferably a fused silica. By using the fused silica, the surface roughness of the roughening-treated surface of the roughened preliminary-cured material can be effectively reduced. The shape of the silica is preferably approximately spherical.

The silica, the first small particle-diameter silica, and the second large particle-diameter silica that are contained in the epoxy resin material are preferably each surface-treated, and more preferably the surface treatment is conducted using a coupling agent. As a result, it becomes possible to further reduce the surface roughness of the roughening-treated surface of the roughened preliminary-cured material, further increase the adhesive strength between the cured object and the metal layer, and provide further excellent inter-wiring insulation reliability and interlayer insulation reliability.

Examples of the coupling agent include silane coupling agents, titanate coupling agents, and aluminium coupling agents, etc. The coupling agent used for surface treatment described above is preferably epoxysilane, aminosilane, vinylsilane, mercaptosilane, sulfur silane, N-phenyl-3-aminopropyl silane, (meth)acrylic silane, isocyanate silane, or ureido silane, etc.

The epoxy resin material contains the first small particle-diameter silica and the second large particle-diameter silica at a weight ratio of preferably 5:95 to 50:50, and more preferably 10:90 to 30:70. By having the epoxy resin material contain the first small particle-diameter silica and the second large particle-diameter silica at the above described weight ratio, the surface roughness of the roughening-treated surface of the roughened preliminary-cured material is further reduced, and the adhesive strength between the cured object and the metal layer is further increased.

There is no particular limitation in the contained amount of the silica. In 100 weight % of the total solid content (hereinafter, sometimes represented as total solid content A) contained in the epoxy resin material, the contained amount of all the silica (including the first small particle-diameter silica and the second large particle-diameter silica) is preferably equal to or more than 30 weight %, more preferably equal to or more than 40 weight %, and further preferably equal to or more than 50 weight %, and preferably equal to or less than 85 weight % and more preferably equal to or less than 80 weight %. When the contained amount of the silica is not lower than the above described lower limit but not higher than the above described upper limit; a thermal coefficient of linear expansion of the resin is suppressed, a difference of expansion coefficients between copper and silicon becomes less, thermal shock reliability improves, warp inhibitory effect is obtained, accuracy of processing improves, and adhesive strength to the metal is increased through roughening and hole formation resulting from elimination and removal of the silica with the roughening treatment. "Total solid content A" refers to the sum of the epoxy resin, the curing agent, the silica, and the solid content that is blended in if necessary. "Solid content" refers to non-volatile components, and components that do not become volatilized at the time of molding or heating.

In 100 weight % of the contained amount of all the silica, the contained amount of the total of the first small particle-diameter silica and the second large particle-diameter silica is preferably equal to or more than 60 weight %, more preferably equal to or more than 80 weight %, further preferably equal to or more than 90 weight %, and particularly preferably equal to or more than 95 weight % but equal to or less than 100 weight %. The first small particle-diameter silica and the second large particle-diameter silica may constitute all the silica.

[Details of Other Components and Epoxy Resin Material]

The epoxy resin material may contain a curing accelerator if necessary. By using the curing accelerator, the curing rate can be further increased. When the epoxy resin material is immediately cured, it becomes possible to homogenize a crosslink structure of the cured object, reduce the number of unreacted functional groups, and, as a result, increase crosslink density. There is no particular limitation in the curing accelerator. As the curing accelerator, a hitherto known curing accelerator can be used. With regard to the curing accelerator, a single type may be used by itself, or a combination of two or more types may be used.

Examples of the curing accelerator include imidazole compounds, phosphorus compounds, amine compounds, and organometallic compounds, etc.

Examples of the imidazole compound include, 2-undecylimidazole, 2-heptadecylimidazole, 2-methylimidazole, 2-ethyl-4-methylimidazole, 2-phenylimidazole, 2-phenyl-4-methylimidazole, 1-benzyl-2-methylimidazole, 1-benzyl-2-phenylimidazole, 1,2-dimethylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-cyanoethyl-2-undecyl imidazolium trimellitate, 1-cyanoethyl-2-phenyl imidazolium trimellitate, 2,4-diamino-6-[2'-methyl imidazolyl-(1')]-ethyl-s-triazine, 2,4-diamino-6-[2'-undecyl imidazolyl-(1')]-ethyl-s-triazine, 2,4-diamino-6-[2'-ethyl-4'-methyl imidazolyl-(1')]-ethyl-s-triazine, 2,4-diamino-6-[2'-methyl imidazolyl-(1')]-ethyl-s-triazine isocyanuric acid adducts, 2-phenyl imidazole isocyanuric acid adducts, 2-methyl imidazole isocyanuric acid adducts, 2-phenyl-4,5-dihydroxymethylimidazole, and 2-phenyl-4-methyl-5-dihydroxymethylimidazole, etc.

Examples of the phosphorus compound include triphenyl phosphine and the like.

Examples of the amine compound include diethylamine, triethylamine, diethylene tetramine, triethylenetetramine, and 4,4-dimethylamino pyridine, etc.

Examples of the organometallic compound include zinc naphthenate, cobalt naphthenate, tin octylate, cobalt octylate, bis acetylacetonato cobalt(II), and tris acetylacetonato cobalt (III), etc.

From a standpoint of increasing the insulation reliability of the cured object, the curing accelerator is particularly preferably an imidazole compound.

There is no particular limitation in the contained amount of the curing accelerator. From a standpoint of efficiently curing the epoxy resin material, in 100 weight % of the total solid content B, the contained amount of the curing accelerator is preferably equal to or more than 0.01 weight % but preferably equal to or less than 3 weight %. It should be noted that the curing accelerator is included in the total solid content B.

The epoxy resin material preferably contains a thermoplastic resin. By using a thermoplastic resin, it becomes possible to increase followability of the epoxy resin material to concavities and convexities of circuits, further reduce the surface roughness of the roughening-treated surface of the roughened preliminary-cured material, and further homogenize the roughness of the roughening-treated surface.

Examples of the thermoplastic resin include phenoxy resins and polyvinyl acetal resins etc. From a standpoint of excellently localizing the silica, further reducing the surface roughness of the roughening-treated surface of the roughened preliminary-cured material, and further increasing the adhesive strength between the cured object and the metal layer; the thermoplastic resin is preferably a phenoxy resin.

Examples of the phenoxy resin include phenoxy resins having backbones such as bisphenol A type backbones, bisphenol F type backbones, bisphenol S type backbones, biphenyl backbones, novolac backbones, and naphthalene backbones.

Since the adhesive strength between the cured object and the metal layer can be increased when a plating process for forming a metal layer is conducted after the roughening treatment of the surface of the preliminary-cured material, the phenoxy resin preferably has a biphenyl backbone, and more preferably has a biphenol backbone.

Specific examples of the phenoxy resin include, for example, "YP50," "YP55," and "YP70" manufactured by Tohto Kasei Co., Ltd., and "1256B40," "4250," "4256H40," "4275," "YX6954BH30," "YX8100BH30," "YL7600DMAcH25," and "YL7213BH30" manufactured by Mitsubishi Chemical Corp.

The weight average molecular weight of the phenoxy resin is preferably equal to or higher than 5000 but preferably equal to or lower than 100000.

There is no particular limitation in the contained amount of the thermoplastic resin. In 100 weight % of the total solid content B, the contained amount of the thermoplastic resin (when the thermoplastic resin is a phenoxy resin, the contained amount of the phenoxy resin) is preferably equal to or more than 0.1 weight %, more preferably equal to or more than 0.5 weight %, and further preferably equal to or more than 1 weight %, and preferably equal to or less than 40 weight %, more preferably equal to or less than 30 weight %, further preferably equal to or less than 20 weight %, and particularly preferably equal to or less than 15 weight %. When the contained amount of the thermoplastic resin is not lower than the above described lower limit but not higher than the above described upper limit, a dimensional change of the cured object due to heat is further reduced. Furthermore, when the contained amount of the thermoplastic resin is not higher than the above described upper limit, embeddability of the epoxy resin material with respect to holes or concavities/convexities of circuit boards becomes excellent. It should be noted that the thermoplastic resin is included in the total solid content B.

For the purpose of improving shock resistance, heat resistance, resin compatibility, and workability, etc.; a coupling agent, a coloring agent, an antioxidant, an ultraviolet-ray-degradation inhibitor, a defoaming agent, a thickening agent, a thixotropic agent, and other resins other than the resins described above may be added to the epoxy resin material.

Examples of the coupling agent include silane coupling agents, titanium coupling agents, and aluminium coupling agents, etc. Examples of the silane coupling agent include aminosilane, imidazole silane, vinylsilane, phenylaminosilane, and epoxysilane, etc.

There is no particular limitation in the contained amount of the coupling agent. In 100 weight % of the total solid content B, the contained amount of the coupling agent is preferably equal to or more than 0.01 weight % but equal to or less than 5 weight %.

Examples of the other resins described above include polyphenylene ether resins, divinylbenzyl ether resins, polyarylate resins, diallyl phthalate resins, polyimide resins, benzoxazine resins, benzoxazole resins, bismaleimide resins, and acrylate resins, etc. It should be noted that the coupling agent is included in the total solid content B.

The epoxy resin material may include a solvent. Examples of the solvent include acetone, methanol, ethanol, butanol, 2-propanol, 2-methoxyethanol, 2-ethoxyethanol, 1-methoxy-2-propanol, 2-acetoxy-1-methoxy propane, toluene, xylene, methyl ethyl ketone, N,N-dimethylformamide, methyl isobutyl ketone, N-methyl-pyrrolidone, n-hexane, cyclohexane, cyclohexanone, and naphtha which is a mixture, etc. With regard to the solvent, a single type may be used by itself, or a combination of two or more types may be used.

A resin composition containing a solvent can be used as a varnish. The viscosity of the varnish can be calibrated by adjusting the contained amount of solvent in accordance with the use application. In the epoxy resin material, with respect to 100 parts by weight of the total solid content A, the contained amount of the solvent is preferably equal to or more than 10 parts by weight but preferably equal to or less than 1000 parts by weight.

(Details of B Stage Film, Lamination Film, Preliminary-Cured Material, Roughened Preliminary-Cured Material, and Laminated Body)

The epoxy resin material may be a resin composition, or a B stage film resulting from molding the resin composition into a film form. The B stage film can be obtained by molding the resin composition into a film form.

Examples of the method for molding the resin composition into a film include: an extrusion method of fusing, kneading, and extruding the resin composition using an extruder, and then molding the resin composition into a film form using a T-die or a circular die, etc.; a mold casting method of dissolving or dispersing the resin composition in a solvent such as an organic solvent or the like, and then casting and molding an obtained mixture into a film form; and hitherto known other film molding methods, etc. In particular, an extrusion method or a mold casting method is preferable since a thinner product can be obtained. The film includes a sheet.

The B stage film can be obtained by molding the resin composition into a film form, and heating and drying the resin composition at, for example, 90 to 200° C. for 10 to 180 minutes at a degree that does not cause curing to excessively advance due to the heat.

A film form resin composition that can be obtained by the drying step as described above is referred to as a B stage film.

The B stage film is a semi-cured object in a semi-cured state. The semi-cured object is not completely cured, and curing can be further advanced.

The resin composition is suitably used for forming a lamination film including a base material and a B stage film laminated on one of the surfaces of the base material. The B stage film for the lamination film is formed using the resin composition.

Examples of the base material for the lamination film include polyester resin films such as polyethylene terephthalate films and polybutylene terephthalate films, olefin resin films such as polyethylene films and polypropylene films, polyimide resin films, and metallic foils such as copper foils and aluminium foils, etc. A release-process may be conducted on the surface of the base material if necessary.

When the epoxy resin material is used as an insulation layer of a circuit, the thickness of the layer formed by the epoxy resin material is preferably equal to or larger than a thickness of a conductor layer forming the circuit. The thickness of the layer formed by the epoxy resin material is preferably not smaller than 5 μm, more preferably not smaller than 6 and further preferably not smaller than 10 μm, and preferably not larger than 200 μm, more preferably not larger than 65 μm, and further preferably not larger than 50 μm.

Preferably, the epoxy resin material is a B stage film, and a preliminary-cured material is obtained by layering the B stage film on the lamination target member through lamination, and then advancing curing of the B stage film. The lamination temperature is preferably equal to or higher than 55° C. and more preferably equal to or higher than 65° C., and preferably equal to or lower than 130° C. and more preferably equal to or lower than 120° C. The lamination pressure is preferably equal to or higher than 0.5 MPa and more preferably equal to or higher than 0.8 MPa, and preferably equal to or lower than 1.5 MPa and more preferably equal to or lower than 1.2 MPa. By laminating the B stage film which is the epoxy resin material, under the conditions as optimized above, the localization state of the first small particle-diameter silica and the second large particle-diameter silica in the preliminary-cured material becomes further excellent. The B stage film formed by the epoxy resin material as described above has a low melt viscosity at around the lamination temperature. In particular, the melt viscosity of a B stage film formed mainly by a cyanate ester curing agent, a liquid epoxy resin, and a phenoxy resin having a low melt viscosity becomes not higher than 150 Pa·s, and the fluidity of the resin component becomes higher. By conducting a lamination process in this state, the first small particle-diameter silica can be selectively moved at a time point when the resin melts, and the first small particle-diameter silica and the resin move at the uppermost surface of the B stage film such that smoothness is obtained after lamination. As a result of this movement, the first small particle-diameter silica is localized in large quantity on the first surface side on which the roughening treatment is conducted. Thus, the first small particle-diameter silica having a relatively small particle diameter exists in large quantity at the upper layer portion of the preliminary-cured material, and the second large particle-diameter silica having a relatively large particle diameter exists in large quantity at the lower layer portion. As a result, when roughening treatment is conducted on the surface of the preliminary-cured material, the surface roughness of the roughening-treated surface of the roughened preliminary-cured material becomes small. Furthermore, the adhesive strength between the cured object and the metal layer becomes high.

There is no particular limitation in the lamination method for laminating the B stage film, and a method known in the art can be used. For example, the B stage film is laminated on a circuit board, and, preferably, the lamination film is laminated from the B stage film side, and pressure is applied using a pressurization type laminator. At this moment, heat may or may not be applied. Next, heat and pressure are applied on the lamination target member and the B stage film or lamination film, using a parallel plate press type heat pressing machine. A preliminary-cured material may be formed through preliminary-curing of the B stage film by applying heat and pressure. There are no particular limitations in the temperature when applying heat and in the pressure when applying pressure, and the temperature and the pressure can be changed as appropriate.

A more specific lamination method is, for example, laminating the B stage film on the circuit board or laminating the lamination film on the lamination target member from the B stage film side, by, using a roll laminator, applying a pressure of 0.5 to 6 MPa at a roll temperature of 20 to 120° C. with a condition of a roll diameter of 60 mm and a speed of 0.1 to 10 m/minute in roll circumferential speed.

After laminating the B stage film or the lamination film on the lamination target member, a heat treatment is preferably conducted for 20 to 180 minutes at 160 to 200° C. By the heat treatment, the B stage film is preliminary-cured, and a preliminary-cured material can be obtained. The base material of the lamination film may be removed before forming the preliminary-cured material, or may be removed after forming the preliminary-cured material. Minute concavities and convexities can be formed on the surface of the roughened preliminary-cured material by conducting the roughening treatment after lamination with the above described conditions. The preliminary-cured material is preferably cured at a temperature 10 to 60° C. lower than a glass transition temperature of a final cured object.

If necessary, smoothness of the surface of the preliminary-cured material may be enhanced using a parallel plate heat pressing machine after the roll lamination. For example, by using the parallel plate heat pressing machine, heat and pressure may be applied using a 1 mm-thick stainless steel plate on a lamination product of the circuit board and the B stage film, or the lamination film.

It should be noted that, commercially available devices can be used as a pressurization type laminator such as a heat-pressurization type roll laminator, and as a pressing machine such as a parallel plate heat pressing machine. The lamination by the roll laminator is preferably conducted in a vacuum state. A material for a roll of the roll laminator can be appropriately selected from rubber rolls having a soft surface and metal rolls having a hard surface. A material for a plate of the parallel plate heat pressing machine is a metal that is hard.

A film having a release function, such as, for example, aluminum foils, copper foils, polyester resin films, and fluororesin based films, may be used between the roll of the roll laminator, and the lamination target member, the B stage film, or the lamination film, or between the plate of the parallel plate heat pressing machine, and the lamination target member, the B stage film, or the lamination film.

For a purpose of increasing adhesivity between the circuit board, and the B stage film or the lamination film, a material having flexibility such as a rubber sheet may be used.

Preferably, the step of forming the preliminary-cured material is a step of laminating the lamination film on the circuit board from the B stage film side, applying pressure using the roll laminator, and then applying heat and pressure using the parallel plate press type heat pressing machine to form the preliminary-cured material. In addition, preferably, the step of forming the preliminary-cured material is a step of laminating the lamination film on the lamination target member from the B stage film side, applying pressure using the roll laminator, and then applying heat and pressure using the parallel plate press type heat pressing machine to form the preliminary-cured material; wherein, the base material is removed preferably after applying pressure using the roll laminator but before applying heat and pressure using the parallel plate press type heat pressing machine, or preferably after applying pressure using the roll laminator and after applying heat and pressure using the parallel plate press type heat pressing machine.

The roughened preliminary-cured material according to the present invention is obtained by conducting a roughening treatment on the first principal surface of the preliminary-cured material. In order to form minute concavities and convexities on the surface of the preliminary-cured material, a swelling treatment is preferably conducted on the preliminary-cured material before conducting the roughening treatment for the roughened preliminary-cured material. For the roughened preliminary-cured material, a swelling treatment is preferably conducted after the preliminary-curing but before the roughening treatment. However, the swelling treatment does not necessarily have to be conducted on the preliminary-cured material.

The laminated body according to the present invention includes: the cured object resulting from curing of the roughened preliminary-cured material obtained by conducting the roughening treatment on the first principal surface of the preliminary-cured material; and the metal layer formed on the roughening-treated surface of the cured object. The adhesive strength between the cured object and the metal layer is preferably not less than 0.39 N/mm. The metal layer is preferably a copper layer, and more preferably a copper plating layer.

(Printed Wiring Board)

The epoxy resin material is suitably used for forming an insulation layer in a printed wiring board.

The printed wiring board is obtained by, for example, using the B stage film formed by the resin composition, and molding the B stage film through application of heat and pressure.

A metallic foil can be laminated on one surface or both surfaces of the B stage film. There is no particular limitation in the method for laminating the B stage film and the metallic foil, and a method known in the art can be used. For example, the B stage film may be laminated on the metallic foil by using a device such as a parallel plate pressing machine or a roll laminator and applying pressure with or without applying heat.

(Copper-Laid Laminated Plate and Multilayer Substrate)

The epoxy resin material is suitably used for obtaining a copper-laid laminated plate. One example of the copper-laid laminated plate is a copper-laid laminated plate including a copper foil, and a B stage film laminated on one surface of the copper foil. The B stage film of the copper-laid laminated plate is formed by the epoxy resin material. By preliminary-curing the B stage film, the copper-laid laminated plate including the preliminary-cured material can be obtained.

There is no particular limitation in the thickness of the copper foil of the copper-laid laminated plate. The thickness of the copper foil is preferably within a range from 1 to 50 µm. Furthermore, in order to increase the adhesive strength between the copper foil and the cured object resulting from curing the epoxy resin material, the surface of the copper foil preferably has minute concavities and convexities. There is no particular limitation in the formation method of the concavities and convexities. Examples of the formation method of the concavities and convexities include a formation method by a process using a chemical known in the art, etc.

In addition, the preliminary-cured material is suitably used for obtaining a multilayer substrate. One example of the multilayer substrate is a circuit board including a circuit board and a cured object layer laminated on one surface of the circuit board. The cured object layer of the multilayer substrate is formed by conducting a roughening treatment on the preliminary-cured material and then curing the roughened preliminary-cured material. The cured object layer is preferably laminated on the surface on which circuits are disposed on the circuit board. One portion of the cured object layer is preferably embedded between circuits.

In the multilayer substrate, more preferably, a roughening treatment is conducted on a surface of the cured object layer opposite to the surface on which the circuit board is laminated. There is no particular limitation in the roughening treatment method, and a hitherto known roughening treatment method can be used. A swelling treatment may be conducted on the surface of the cured object layer before the roughening treatment.

In addition, the multilayer substrate preferably includes a copper plating layer laminated on the roughening-treated surface of the cured object layer.

Furthermore, other examples of the multilayer substrate include a circuit board having: a circuit board; a cured object layer laminated on the surface of the circuit board; and a copper foil laminated on a surface of the cured object layer opposite to the surface on which the circuit board is laminated. The copper foil and the cured object layer are preferably formed by using a copper-laid laminated plate including the copper foil and a B stage film laminated on one of the surfaces of the copper foil, and preliminary-curing, roughening, and curing the B stage film. Furthermore, an etching process is preferably conducted on the copper foil to from a copper circuit.

Other examples of the multilayer substrate include a circuit board including a circuit board and multiple cured object layers laminated on the surface of the circuit board. At least one layer of the multiple layers of the cured object layer is formed by the preliminary-cured material. The multilayer substrate preferably further includes a circuit laminated on at least one of the surfaces of the cured object layer formed by curing the epoxy resin material.

Figure 2:
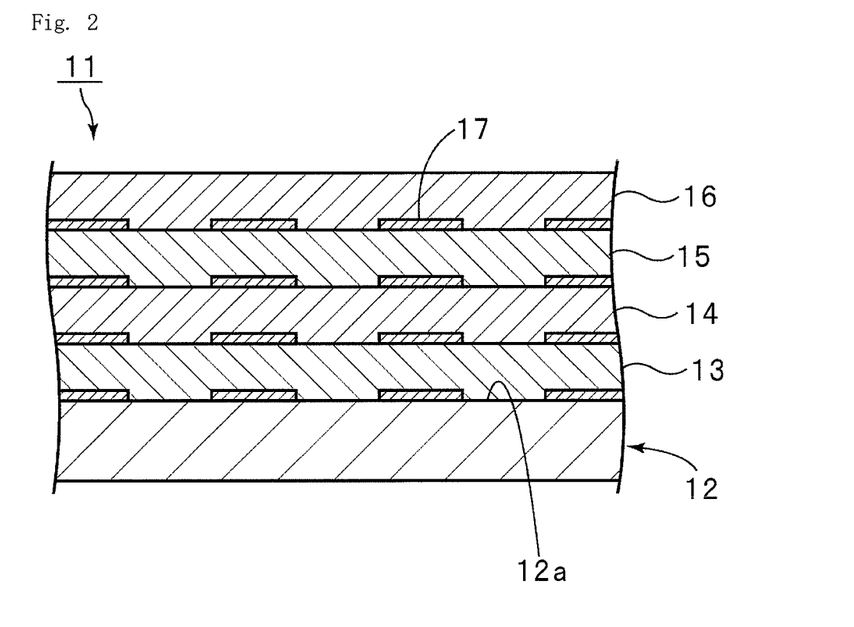
FIG. 2 is a partially-cut front sectional view that schematically shows a laminated body using a preliminary-cured material according to one embodiment of the present invention.

FIG. 2 is a partially-cut front sectional view that schematically shows a laminated body using a preliminary-cured material according to one embodiment of the present invention.

In a laminated body 1 shown in FIG. 2, multiple layers of cured object layers 13 to 16 are laminated on an upper surface 12a of a circuit board 12. The cured object layers 13 to 16 are insulation layers. Metal layers 17 are formed on one region of the upper surface 12a of the circuit board 12. Of the multiple layers of the cured object layers 13 to 16, the metal layers 17 are formed on one region of the upper surfaces of the cured object layers 13 to 15 excluding the cured object layer 16 located on an outer side surface opposite of the circuit board 12 side. The metal layers 17 are circuits. The metal layers 17 are arranged between the circuit board 12 and the cured object layer 13, and in each interlayer of the laminated cured object layers 13 to 16. A metal layer 17 located below and a metal layer 17 located above are connected to each other by at least one of a via-hole connection and a through-hole connection not shown.

In the laminated body 11, the cured object layers 13 to 16 are formed by curing the epoxy resin material according to the present invention. It should be noted that, in FIG. 2, for convenience of illustration, diagrammatic representation of silica in the cured object layers 13 to 16, and pores resulting from elimination of the silica are omitted. In the present embodiment, since roughening treatment is conducted on the surfaces of the cured object layers 13 to 16, minute pores, which are not diagrammatically represented, are formed on the surfaces of the cured object layers 13 to 16. In addition, the metal layers 17 extend inside the minute pores. Furthermore, in the laminated body 11, a width direction size (L) of the metal layers 17 and a width direction size (S) of a portion on which the metal layers 17 are not formed can be reduced. Additionally in the laminated body 11, excellent insulation reliability is provided between an upper metal layer and a lower metal layer that are not connected by the via-hole connection and the through-hole connection that are not shown.

(Swelling Treatment and Roughening Treatment)

As a method for the swelling treatment, for example, a method of treating the preliminary-cured material using such as an organic solvent dispersed solution or an aqueous solution of a compound whose main component is ethylene glycol is used. A swelling liquid used in the swelling treatment generally includes an alkali as a pH adjuster etc. The swelling liquid preferably contains sodium hydroxide. Specifically, for example, the swelling treatment is conducted using a 40 weight % ethylene glycol solution etc., and treating the preliminary-cured material for 1 to 30 minutes at a treatment temperature from 30 to 85° C. The temperature for the swelling treatment is preferably within a range from 50 to 85° C. If the temperature for the swelling treatment is too low, long time is required for the swelling treatment, and a post-roughened adhesive strength between the cured object and the metal layer tends to be low.

For the roughening treatment, for example, a chemical oxidant such as a manganese compound, a chromium compound, or a persulfuric acid compound is used. Such chemical oxidants are added to water or an organic solvent and used as an aqueous solution or an organic solvent dispersed solution. A roughening liquid used for the roughening treatment generally contains an alkali as a pH adjuster etc. The roughening liquid preferably contains sodium hydroxide.

Examples of the manganese compound include potassium permanganate and sodium permanganate etc. Examples of the chromium compound include potassium dichromate and potassium chromate anhydrous etc. Examples of the persulfuric acid compound include sodium persulfate, potassium persulfate, and ammonium persulfate etc.

There is no particular limitation in the method for conducting the roughening treatment. A suitable method for the roughening treatment is, for example, a method of treating a preliminary-cured material once or twice using a 30 to 90 g/L permanganic acid or permanganate solution and a 30 to 90 g/L sodium hydroxide solution with a condition of treatment temperature of 30 to 85° C. for 1 to 30 minutes. The temperature for the roughening treatment is preferably within a range from 50 to 85° C.

An arithmetic mean roughness Ra of the roughening-treated surface of the roughened preliminary-cured material is preferably not smaller than 50 nm, more preferably not larger than 350 nm, and further preferably not larger than 300 nm. In this case, the adhesive strength between the cured object and the metal layer can be further increased, and further miniaturized wiring can be formed on the surface of the cured object layer.

(Desmear Treatment)

Furthermore, a penetration hole may be formed on the preliminary-cured material or the cured object. In the multilayer substrate, a via-hole or through-hole etc., is formed as the penetration hole. For example, the via-hole can be formed through irradiation of laser such as a $CO_2$ laser or the like. There is no particular limitation in the diameter of the via-hole, and it is about 60 to 80 μm. By forming the penetration hole, a smear, which is a residue of resin derived from a resin component contained in a cured object layer, is often formed at the bottom within the via-hole.

In order to remove the smear, a desmear treatment is preferably conducted on the surface of the preliminary-cured material. The desmear treatment may also double as the roughening treatment. The desmear treatment is sometimes referred to as the roughening treatment.

Similar to the roughening treatment, for the desmear treatment, for example, a chemical oxidant such as a manganese compound, a chromium compound, or a persulfuric acid compound is used. Such chemical oxidants are added to water or an organic solvent, and used as an aqueous solution or an organic solvent dispersed solution. A desmear treatment liquid used for the desmear treatment generally contains an alkali. The desmear treatment liquid preferably contains sodium hydroxide.

There is no particular limitation in the method for conducting the desmear treatment. A suitable method for the desmear treatment is, for example, a method of treating a preliminary-cured material or a cured object once or twice using a 30 to 90 g/L permanganic acid or permanganate solution and a 30 to 90 g/L sodium hydroxide solution with a condition of treatment temperature of 30 to 85° C. for 1 to 30 minutes. The temperature for the desmear treatment is preferably within a range from 50 to 85° C.

In the following, the present invention will be described specifically with Examples and Comparative Examples. The present invention is not limited to the following Examples.

Materials shown in the following were used in the Examples and Comparative Examples.

(Epoxy Resin)

Epoxy resin 1 (Bisphenol F type epoxy resin, "830-S" manufactured by DIC Corp., liquid at normal temperature (23° C.))

Epoxy resin 2 (Biphenyl novolac type epoxy resin, "NC3000H" manufactured by Nippon Kayaku Co., Ltd., solid at normal temperature (23° C.), softening point 70° C.)

Epoxy resin 3 (Dicyclopentadiene type epoxy resin, "HP-7200" manufactured by DIC Corp., solid at normal temperature (23° C.), softening point 61° C.)

(Curing Agent)

Active ester compound solution ("EXB-9460S-65T" manufactured by DIC Corp.; active ester equivalent 223; contains 65 weight % of an active ester compound (solid content) and 35 weight % of toluene)

Cyanate ester resin solution (Cyanate ester curing agent; a prepolymer obtained by modifying bisphenol A dicyanate to have a triazine structure so as to be a trimer; "BA230S-75" manufactured by Lonza Japan Ltd.; cyanate equivalent 230; contains 75 weight % of a cyanate ester resin (solid content) and 25 weight % of methyl ethyl ketone)

Phenolic compound (Phenol curing agent, "MEH7851-4H" manufactured by Meiwa Plastic Industries, Ltd., phenolic hydroxyl group equivalent 242)

Phenolic compound solution (Phenol curing agent having an aminotriazine backbone; "LA3018-50P" manufactured by DIC Corp.; phenolic hydroxyl group equivalent 151; contains 50 weight % of a phenolic compound (solid content) and 50 weight % of propylene glycol monomethyl ether)

(Curing Accelerator)

Imidazole compound 1 (2-ethyl-4-methylimidazole, "2E4MZ" manufactured by Shikoku Chemicals Corp.)

Imidazole compound 2 (2-phenyl-4-methyl-5-hydroxymethylimidazole "2P4 MHZ-PW" manufactured by Shikoku Chemicals Corp.)

(Silica Component)

First Small Particle-Diameter Silica Containing Slurry A:

A first small particle-diameter silica containing slurry that includes 65 weight % of a first small particle-diameter silica a (obtained by surface treating a silica ("YA050C-MMK" manufactured by Admatechs Co., Ltd., mean particle diameter 0.05 μm) using phenylsilane (phenyltrimethoxysilane, "KBM-103" manufactured by Shin-Etsu Chemical Co., Ltd.)) and 35 weight % of methyl ethyl ketone.

First Small Particle-Diameter Silica Containing Slurry B:

A first small particle-diameter silica containing slurry that includes 30 weight % of a first small particle-diameter silica b (obtained by surface treating a silica ("UFP-30" manufactured by Denki Kagaku Kogyo K. K., mean particle diameter 0.1 μm) using imidazole silane ("IM-1000" manufactured by Nippon Mining & Metals Co., Ltd.,) and 70 weight % of N,N-dimethylformamide.

Slurry X Including Both the First Small Particle-Diameter Silica and the Second Large Particle-Diameter Silica:

A slurry that includes both the first small particle-diameter silica and the second large particle-diameter silica, containing 70 weight % of the first small particle-diameter silica and second large particle-diameter silica x (obtained by surface treating a silica ("SO—C2" manufactured by Admatechs Co., Ltd., mean particle diameter 0.5 μm) using epoxysilane (3-glycidoxypropyltrimethoxysilane, "KBM-403" manufactured by Shin-Etsu Chemical Co., Ltd.,) and 30 weight % of methyl ethyl ketone.

The slurry X has a broad particle size distribution, and includes silica having a particle diameter of 0.01 μm to a particle diameter of 20 μm. In the slurry X, the contained amount of the first small particle-diameter silica is 50 volume % and the contained amount of the second large particle-diameter silica x is 50 volume %, in the total 100 volume % of the first small particle-diameter silica and the second large particle-diameter silica.

Second Large Particle-Diameter Silica Containing Slurry Y:

A second large particle-diameter silica containing slurry that includes 50 weight % of a second large particle-diameter silica y (obtained by surface treating a silica ("UF-320" manufactured by Tokuyama Corp., mean particle diameter 3.5 μm, coarse particle cut-point 20 μm) using imidazole silane ("IM-1000" manufactured by Nippon Mining & Metals Co., Ltd.,) and 50 weight % of N,N-dimethylformamide.

(Thermoplastic Resin)

Phenoxy resin ("YX6954BH30" manufactured by Mitsubishi Chemical Corp.)

Example 1

(1) Production of Resin Composition and Lamination Film

A resin composition was obtained by blending and agitating the following components for 1 hour at 1200 rpm using an agitator: 5 parts by weight of the first small particle-diameter silica containing slurry A in solid content; 55 parts by weight of the second large particle-diameter silica containing slurry Y in solid content; 10 parts by weight of the epoxy resin 1 (bisphenol F type epoxy resin, "830-S" manufactured by DIC Corp.); 10 parts by weight of the epoxy resin 2 (biphenyl novolac type epoxy resin, "NC3000H" manufactured by Nippon Kayaku Co., Ltd.); 10 parts by weight of the cyanate ester resin solution (cyanate ester curing agent, "BA230S-75" manufactured by Lonza Japan Ltd.) in solid content; 0.5 parts by weight of the imidazole compound 1 ("2E4MZ" manufactured by Shikoku Chemicals Corp.); and 9.5 parts by weight of the phenoxy resin ("YX6954BH30" manufactured by Mitsubishi Chemical Corp.).

A release-processed and transparent polyethylene terephthalate (PET) film ("PET5011 550" manufactured by LINTEC Corp., thickness 50 μm) was prepared. The obtained resin composition was coated on the release-processed surface of the PET film using an applicator, such that the thickness of the coating becomes 50 μm after drying. Next, the coated object was dried for 2 minutes at 100° C. in a gear oven to produce a lamination film of: an un-cured object (B stage film) of a resin sheet having a size of length 200 mm×width 200 mm×thickness 50 μm; and the polyethylene terephthalate film. Next, the polyethylene terephthalate film was peeled off the lamination film, and the un-cured object of the resin sheet was heated for 80 minutes at 180° C. in the gear oven to produce a preliminary-cured material of the resin sheet.

(2) Production of Laminated Body Including Preliminary-Cured Material

The obtained lamination film was set such that the B stage film is located on a side of a glass epoxy substrate (FR-4, stock number "CS-3665", manufactured by Risho Kogyo Co., Ltd.). Pressure and heat were applied on the lamination film and the glass epoxy substrate for 60 minutes at 0.5 MPa under a reduced pressure using a parallel plate pressing machine that had been heated to 100° C., and a laminated body including the preliminary-cured material of the resin sheet was obtained. Then, the polyethylene terephthalate film was peeled off, and a laminated body A of the glass epoxy substrate and the preliminary-cured material was obtained. The obtained preliminary-cured material has a second principal surface on the glass epoxy substrate side, and a first principal surface which is a surface that is to be roughening-treated located on an opposite side of the glass epoxy substrate.

Examples 2 to 10, and Comparative Examples 1 to 2

Except for changing the type of the used materials and blend amount as shown in the following Table 1, resin compositions, lamination films of PET films and B stage films, and laminated bodies of glass epoxy substrates and preliminary-cured materials were obtained similarly to Example 1.

(Evaluation)

(1) Minimum Melt Viscosity of Epoxy Resin Material

Viscosity of an un-cured object (B stage film) of an obtained resin sheet was measured in a temperature range from 50 to 150° C. using a rheometer device ("AR-2000" manufactured by TA Instruments Inc.) with a condition of deformation of 21.6% and frequency of 1 Hz; and a value indicating a lowest viscosity was considered as a minimum melt viscosity.

(2) Silica Existing Status 1

Cross-sectional observations were conducted for preliminary-cured materials in laminated bodies A obtained in the Examples and Comparative Examples. Existing status 1 of silica in a preliminary-cured material was judged using the following judgment criteria.

[Judgment Criteria of Silica Existing Status 1]

○: In a preliminary-cured material, the first small particle-diameter silica is localized so as to exist in large quantity on the first principal surface side, and the second large particle-diameter silica is localized so as to exist in large quantity on the second principal surface side.

x: The first small particle-diameter silica is not localized so as to exist in large quantity on the first principal surface side, or the second large particle-diameter silica is not localized so as to exist in large quantity on the second principal surface side.

xx: The first small particle-diameter silica is not localized so as to exist in large quantity on the first principal surface side, and the second large particle-diameter silica is not localized so as to exist in large quantity on the second principal surface side.

(3) Silica Existing Status 2

When a judgment result of the silica existing status 1 was "○", an evaluation was conducted for a proportion (volume %) of the contained amount of the second large particle-diameter silica in 100 weight % of all silica contained in the first region that is a 0.3 μm-thick surface portion on the first principal surface side which is the surface that is to be roughening-treated. In addition, thickness of the second region was also evaluated.

(4) Adhesive Strength (Peel Strength) and Arithmetic Mean Roughness Ra

[Production of Cured Object B]

On the preliminary-cured material of the laminated body A, the following (a) swelling treatment, (b) permanganate treatment, i.e., the roughening treatment, and (c) copper plating process were conducted.

(a) Swelling Treatment:

The laminated body A was placed in a 60° C. swelling liquid (Swelling dip Securigant P, manufactured by Atotech Japan Co., Ltd.), and was shaken for 20 minutes. Then, the laminated body A was rinsed with pure water.

(b) Permanganate Treatment:

The laminated body was placed in a 75° C. potassium permanganate (Concentrate Compact CP, manufactured by Atotech Japan Co., Ltd) roughening solution, and was shaken for 20 minutes to obtain, on a glass epoxy substrate, a roughened preliminary-cured material on which a roughening treatment had been conducted. The obtained roughened preliminary-cured material was rinsed for 2 minutes with a 23° C. rinsing liquid (Reduction Securigant P, manufactured by Atotech Japan Co., Ltd.), and then was rinsed again with pure water.

After the roughened preliminary-cured material was dried for 2 hours at 120° C. in a gear oven and then cooled, an arithmetic mean roughness Ra of a roughening-treated surface of the roughened preliminary-cured material was measured in accordance with JIS B0601-1994.

(c) Copper Plating Process:

Next, an electroless copper plating process and an electrolytic copper plating process were conducted with the following procedure, on the roughened preliminary-cured material which was on the glass epoxy substrate and had been roughening-treated.

The surface of the roughened preliminary-cured material was processed for 5 minutes using a 55° C. alkaline cleaner (Cleaner Securigant 902) for delipidating and rinsing. After the rinsing, the roughened preliminary-cured material was processed for 2 minutes in a 23° C. predip liquid (Pre-dip Neogant B). Then, the roughened preliminary-cured material was processed for 5 minutes in a 40° C. activator liquid (Activator Neogant 834) to provide a palladium catalyst. Next, the roughened preliminary-cured material was processed for 5 minutes in a 30° C. reduction liquid (Reducer Neogant WA).

Next, the roughened preliminary-cured material was placed in a chemically copper enriched liquid (Basic Printgant MSK-DK, Copper Printgant MSK, Stabilizer Printgant MSK), and electroless plating was performed until the thickness of the plating was about 0.5 μm. After the electroless plating, annealing was performed for 30 minutes at a temperature of 120° C. in order to remove residual hydrogen gas. All the steps to the step of electroless plating were conducted in a beaker scale where the processing liquids were 1 L, and were conducted while the cured object was shaken.

Next, electrolysis plating was performed on the roughened preliminary-cured material on which the electroless plating process had been performed, until the thickness of the plating was 25 μm. Copper sulfate (Reducer Cu) was used as the electrolytic copper plating, and an electric current of 0.6 A/cm$^2$ was applied. After the copper plating process, the roughened preliminary-cured material was heated for 1 hour at 190° C. and cured to obtain a cured object B having a copper plating layer formed thereon.

[Adhesive Strength Measuring Method]

A 10 mm width notch was made on the surface of the copper plating layer of the cured object B formed with the copper plating layer. Then, an adhesive strength (peel strength) between the copper plating layer and the cured object was measured using a tensile testing machine (product name "Autograph", manufactured by Shimadzu Corp.,) with a condition of crosshead speed of 5 mm/min.

The results are shown in the following Table 1. It should be noted that, in the following Table 1, "total solid content A" represents the total solid content included in the epoxy resin material, and "-" indicates that an evaluation was not conducted.

TABLE 1

| | | Example 1 | Example 2 | Example 3 | Example 4 | Example 5 | Example 6 | Example 7 |
|---|---|---|---|---|---|---|---|---|
| Blended component (parts by weight in solid content) | Epoxy resin 1 (830-S) | 10 | 10 | 10 | 10 | 10 | 15 | 15 |
| | Epoxy resin 2 (NC3000H) | 8 | 10 | | | 10 | 5 | 5 |
| | Epoxy resin 3 (HP-7200) | | | 10 | 10 | | | |
| | Active ester compound solution (EXB-9460S-65T) | | | | | 10 | | |
| | Cyanate ester resin solution (BA230S-75) | 10 | 10 | 10 | 10 | | | |
| | Phenolic compound (MEH7851-4H) | | | | | | 10 | |
| | Phenolic compound solution (LA3018-50P) | | | | | | | 8 |
| | Imidazole compound 1 (2E4MZ) | 0.5 | 0.5 | 0.5 | 0.5 | 0.5 | | |
| | Imidazole compound 2 (2P4MHZ-PW) | | | | | | 0.5 | 0.6 |
| | First small particle-diameter silica containing slurry A (YA050C-MMK used) | 5 | | | 5 | 5 | 5 | 5 |
| | First small particle-diameter silica containing slurry B (UFP-30 used) | | 5 | 5 | | | | |
| | Slurry X containing first small particle-diameter and second large particle-diameter silica (SO-C2 used) | | | | | | | |
| | Second large particle-diameter silica containing slurry Y (UF-320 used) | 55 | 55 | 55 | 55 | 55 | 55 | 55 |
| | Phenoxy resin (YX6954BH30) | 9.5 | 9.5 | 9.5 | 9.5 | 9.5 | 5 | 5 |

TABLE 1-continued

| | | | | | | | |
|---|---|---|---|---|---|---|---|
| Contained amount (weight %) of all silica in 100 weight % of total solid content A | 60 | 60 | 60 | 60 | 60 | 60 | 60 |
| Evaluation Minimum melt viscosity of epoxy resin material (Pa·s) | 90 | 130 | 110 | 75 | 140 | 150 | 150 |
| Silica existing status 1 | ○ | ○ | ○ | ○ | ○ | ○ | ○ |
| Silica existing status 2: Proportion (volume %) of second large particle-diameter silica included in 100 volume % of all silica in first region | 3 | 3 | 4 | 3 | 3 | 4 | 4 |
| Arithmetic mean roughness Ra (nm) | 95 | 110 | 58 | 40 | 63 | 45 | 93 |
| Adhesive strength (N/mm) | 0.5 | 0.4 | 0.5 | 0.6 | 0.4 | 0.4 | 0.5 |

| | | | Example 8 | Example 9 | Example 10 | Comparative Example 1 | Comparative Example 2 |
|---|---|---|---|---|---|---|---|
| Blended component (parts by weight in solid content) | Epoxy resin 1 (830-S) | | 10 | 10 | 10 | 5 | 10 |
| | Epoxy resin 2 (NC3000H) | | 10 | 10 | 10 | 20 | 5 |
| | Epoxy resin 3 (HP-7200) | | | | | | |
| | Active ester compound solution (EXB-9460S-65T) | | | | | | |
| | Cyanate ester resin solution (BA230S-75) | | 10 | 10 | 10 | | 10 |
| | Phenolic compound (MEH7851-4H) | | | | | 10 | |
| | Phenolic compound solution (LA3018-50P) | | | | | | |
| | Imidazole compound 1 (2E4MZ) | | 0.5 | 0.5 | 0.5 | 0.5 | 0.5 |
| | Imidazole compound 2 (2P4MHZ-PW) | | | | | | |
| | First small particle-diameter silica containing slurry A (YA050C-MMK used) | | 5 | 3 | | 5 | 3 |
| | First small particle-diameter silica containing slurry B (UFP-30 used) | | | | | | |
| | Slurry X containing first small particle-diameter and second large particle-diameter silica (SO-C2 used) | | | | 60 | | |
| | Second large particle-diameter silica containing slurry Y (UF-320 used) | | 55 | 57 | | 55 | 57 |
| | Phenoxy resin (YX6954BH30) | | 9.5 | 9.5 | 9.5 | 3 | |
| Contained amount (weight %) of all silica in 100 weight % of total solid content A | | | 60 | 60 | 60 | 60 | 60 |
| Evaluation | Minimum melt viscosity of epoxy resin material (Pa·s) | | 120 | 150 | 110 | 450 | 5 |
| | Silica existing status 1 | | ○ | ○ | ○ | xx | xx |
| | Silica existing status 2: Proportion (volume %) of second large particle-diameter silica included in 100 volume % of all silica in first region | | 4 | 7 | 3 | — | — |
| | Arithmetic mean roughness Ra (nm) | | 82 | 150 | 95 | 230 | 240 |
| | Adhesive strength (N/mm) | | 0.4 | 0.3 | 0.5 | 0.3 | 0.2 |

DESCRIPTION OF THE REFERENCE CHARACTERS

1 . . . preliminary-cured material
1a . . . first principal surface
1b . . . second principal surface
2 . . . silica
2A . . . first small particle-diameter silica
2B . . . second large particle-diameter silica
6 . . . lamination target member
6a . . . upper surface
11 . . . laminated body
12 . . . circuit board
12a . . . upper surface
13 to 16 . . . cured object layer
17 . . . metal layer
R1 . . . first region
R2 . . . second region

The invention claimed is:

1. A laminated body comprising:
a cured object resulting from curing a roughened preliminary-cured material obtained by conducting a roughening treatment on the first principal surface of a preliminary-cured material obtained by advancing curing of an epoxy resin material, wherein:
the preliminary-cured material includes a first principal surface, a second principal surface, and a region comprising a first region and a second region, wherein
the first principal surface is a surface on which a roughening treatment is to be conducted, the first region and the second region are in direct contact with each other, and the second region is the rest of the region excluding the first region;
the epoxy resin material contains an epoxy resin, a curing agent, and a silica;
the silica includes a first small particle-diameter silica whose particle diameter is not smaller than 0.01 μm but smaller than 0.5 μm, and a second large particle-diameter silica whose particle diameter is not smaller than 0.5 μm but not larger than 20 μm; and
in the preliminary-cured material, the first small particle-diameter silica is localized so as to exist in large quantity on a side of the first principal surface which is the surface where the roughening treatment is to be conducted, and the second large particle-diameter silica is localized so as to exist in large quantity on a side of the second principal surface,
wherein, with respect to 100 volume % of all silica included in the first region that is a 0.3 μm-thick surface portion on the first principal surface side which is the surface where the roughening treatment is to be conducted, a contained amount of the second large particle-diameter silica in the first region is not more than 5 volume %, and wherein, with respect to 100 volume % of all silica included in the second region, a contained amount of the first small particle-diameter silica in the second region is not more than 5 volume %;

a metal layer formed on the surface of the cured object, on which the roughening treatment has been conducted; and a lamination target member in contact with a surface of the cured object opposite to that on which the roughening treatment has been conducted.

2. The laminated body according to claim 1, wherein a minimum melt viscosity of the epoxy resin material in a temperature range of 60 to 120° C. before preliminary-curing is not lower than 50 Pa·s but not higher than 150 Pa·s.

3. The laminated body according to claim 2, wherein the epoxy resin material further contains a phenoxy resin.

4. The laminated body according to claim 1, wherein the epoxy resin material further contains a phenoxy resin.

5. The laminated body according to claim 1, wherein a swelling treatment is conducted on the preliminary-cured material before the roughening treatment.

6. The laminated body according to claim 1, wherein an adhesive strength between the cured object and the metal layer is not less than 0.39 N/mm.

* * * * *

UNITED STATES PATENT AND TRADEMARK OFFICE
CERTIFICATE OF CORRECTION

PATENT NO.       : 9,120,293 B2
APPLICATION NO.  : 13/582214
DATED            : September 1, 2015
INVENTOR(S)      : R. Yokota et al.

It is certified that error appears in the above-identified patent and that said Letters Patent is hereby corrected as shown below:

On the title page, item 73 Assignee, please change "SEIKU CHEMICAL CO., LTD.," to
-- SEKISUI CHEMICAL CO., LTD., --.

Signed and Sealed this
Fifth Day of April, 2016

Michelle K. Lee
*Director of the United States Patent and Trademark Office*